United States Patent [19]

Bruhnke

[11] Patent Number: 5,903,643
[45] Date of Patent: May 11, 1999

[54] MULTI-LINE STATION INTERFACE

[75] Inventor: Howard Bruhnke, Massapequa Park, N.Y.

[73] Assignee: Teleport Communications Group, Inc., Staten Island, N.Y.

[21] Appl. No.: 08/867,040

[22] Filed: Jun. 4, 1997

Related U.S. Application Data

[63] Continuation of application No. 08/458,641, Jun. 2, 1995, abandoned.

[51] Int. Cl.[6] ............................. H04M 1/00; H04M 3/42
[52] U.S. Cl. ........................ 379/399; 379/156; 379/165; 379/201; 379/387
[58] Field of Search .................................. 379/201, 207, 379/210, 211, 156, 242, 165, 164, 177, 182

[56] References Cited

U.S. PATENT DOCUMENTS

| | | | |
|---|---|---|---|
| Re. 34,735 | 9/1994 | Kuabe et al. | 379/215 X |
| 3,963,873 | 6/1976 | Pommerening et al. | 379/201 |
| 4,410,765 | 10/1983 | Hestad et al. | 379/377 X |
| 4,486,626 | 12/1984 | Kohler | 379/196 |
| 4,570,035 | 2/1986 | Pinede et al. | 379/164 |
| 4,631,367 | 12/1986 | Coviello et al. | 379/157 |
| 4,674,115 | 6/1987 | Kaleita et al. | 379/397 X |
| 4,817,132 | 3/1989 | Chamberlin et al. | 379/165 |
| 4,821,319 | 4/1989 | Middleton et al. | 379/399 X |
| 5,067,125 | 11/1991 | Tsuchida | 370/79 |
| 5,153,908 | 10/1992 | Kakizawa et al. | 379/157 |
| 5,204,861 | 4/1993 | Wiebe | 379/156 X |
| 5,251,254 | 10/1993 | Tanigawa et al. | 379/165 |
| 5,341,415 | 8/1994 | Baran | 379/201 |
| 5,400,395 | 3/1995 | Berenato | 379/114 |
| 5,408,525 | 4/1995 | Eldering | 379/161 |
| 5,422,949 | 6/1995 | Tsukagoshi | 379/399 |
| 5,425,085 | 6/1995 | Weinberger et al. | 379/112 |
| 5,448,635 | 9/1995 | Biehl et al. | 379/399 |
| 5,467,395 | 11/1995 | Izumi | 379/399 |
| 5,502,762 | 3/1996 | Andrew et al. | 379/202 |
| 5,548,592 | 8/1996 | Komarek et al. | 370/85.1 |
| 5,563,938 | 10/1996 | Soshea et al. | 379/156 X |

OTHER PUBLICATIONS

"Rochester Tel plan passes key hurdle" by Jim DiLorenzo, Telephony, May 23, 1994.
"Time Warner seeks LEC status in Ohio" by Dan O'Shea, Telephony, Oct. 31, 1994.

Primary Examiner—Harry S. Hong
Assistant Examiner—Benny Q. Tieu
Attorney, Agent, or Firm—Scully, Scott, Murphy & Presser

[57] ABSTRACT

A multi-line interface device routes incoming and outgoing communication signals between one or more service providers and one or more customer stations. The device comprises one or more line access modules each for establishing communication between an interface device and one or more service providers, a first of the one or more line access modules in communication with a first service provider and a second line access module in communication with a second service provider. Additionally, one or more station access modules is provided for establishing communication between the interface device and the one or more customer stations, each of the one or more station access modules connected with a dedicated customer station. A bus switching device is provided for connecting signals between any of the line access modules and station access modules under the control of a control device.

20 Claims, 5 Drawing Sheets

MULTI-LINE STATION INTERFACE

This application is a continuation of application Ser. No. 08/458,641 filed Jun. 2, 1995, now abandoned.

1. Field of the Invention

The present invention relates generally to interface devices for providing telephone services to customers, and in particular, to a multi-line interface device that enables an additional secondary phone service provider to provide telephone service to/from a premises that is already furnished with telephone lines of an existing primary telephone service provider, the device being installed in the premises without the need to provide additional telephone devices, and, without the intrusion and necessity of significant rewiring.

2. Description of the Prior Art

Adding secondary telephone service to a residence or small business location ("premises") presents significant difficulties in reconfiguring the premises for the multi-line services. For instance, there is a very strong probability that existing telephone services of a primary service provider or local exchange company ("LEC") will not be disconnected initially. Consequently, the existing customer-owned inside wire and single line telephones will remain in place and the new service provider is faced with the dilemma of installing a new telephone(s) within the premises which would require additional telephone(s) and necessitate the rewiring of the premises. Although the existence of quad wire may someday overcome some of the problems involved in providing multiple-line connections, it is very doubtful that continuity exists for the second line and rewiring is necessary at the phone demarc to intercept and redirect a spare pair of wires to the alternate service provider. Furthermore, each location where a second phone is to be added must be required to receive an RJ-11 plug from the new telephone.

Figure 1A:
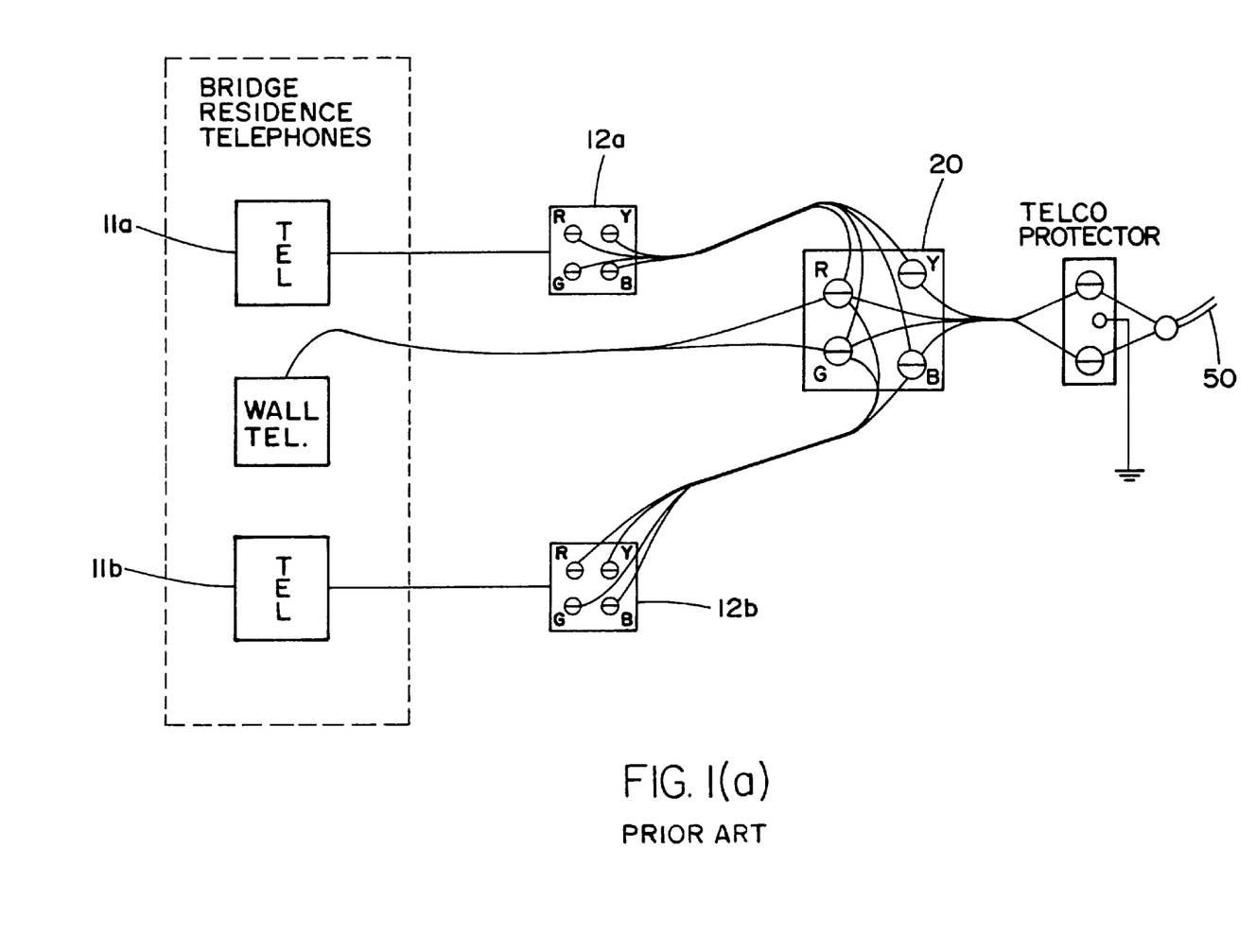
FIGS. 1(a)–1(d) illustrate prior art and conventional methods for adding second phones to a household/business premises.
Figure 1B:
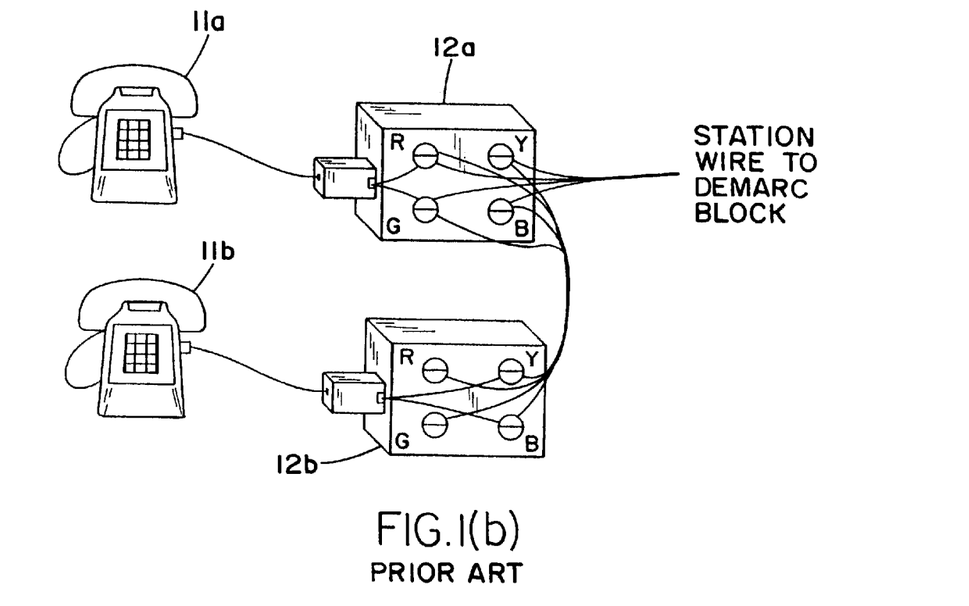
Figure 1C:
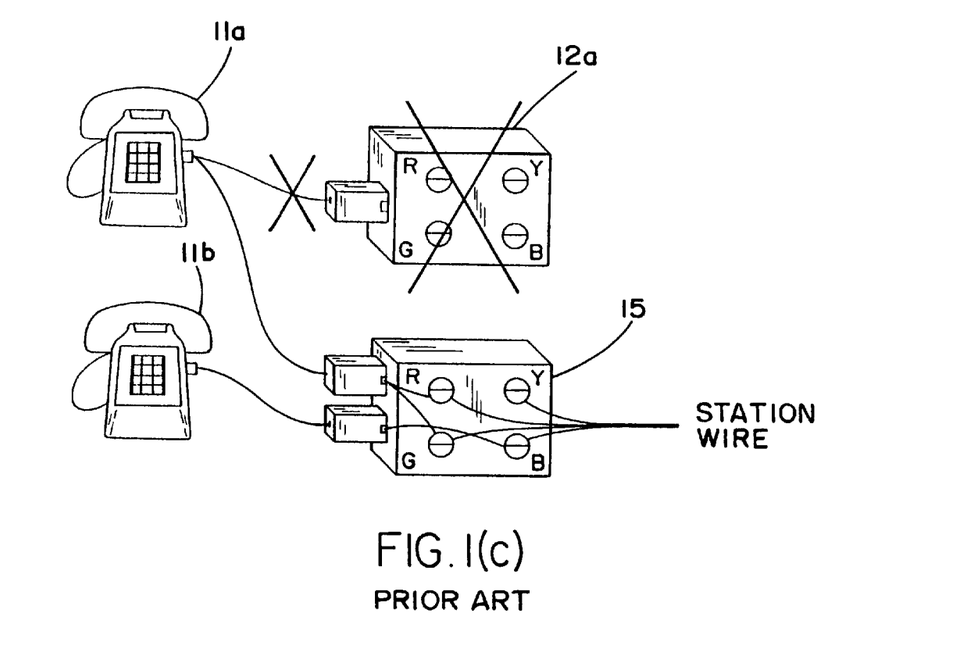
Figure 1D:
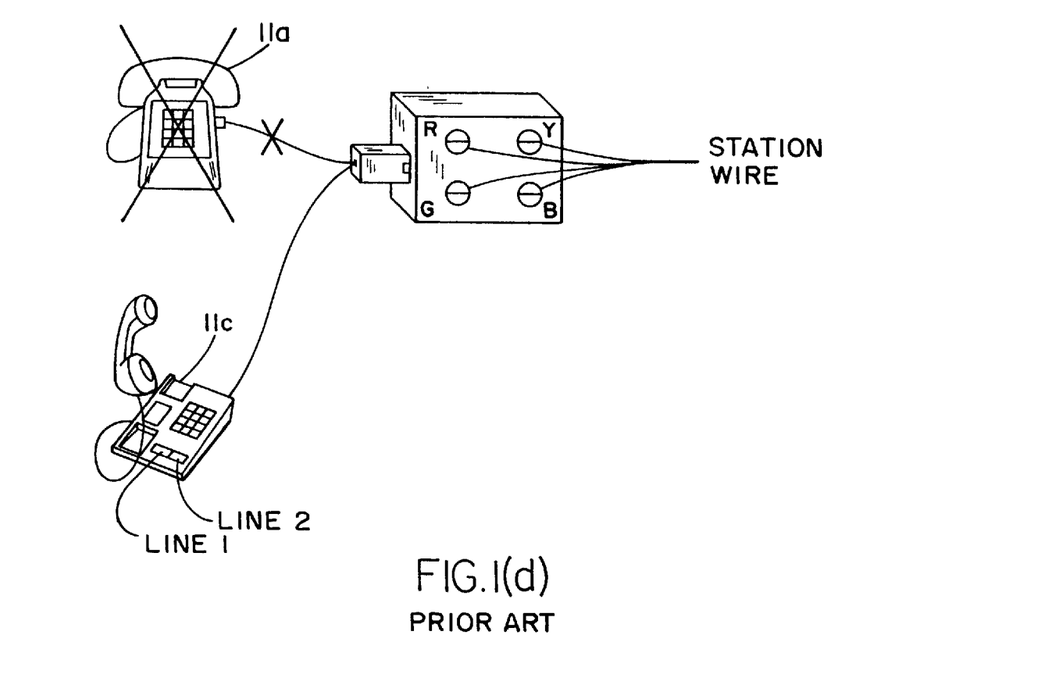

It is the case that the complexity of installing a second telephone adjacent to an existing one is both costly and not conducive to customers' preferences. A few of the conventional ways for accomodating the addition of a new telephone is shown in FIGS. 1(a)–1(c), where: FIG. 1(a) illustrates the "bridging" of two telephones 11a and 11b by connecting respective plug blocks 12a and 12b to the demarc connecting block 20 connecting the LEC line 50; FIG. 1(b) illustrates the wiring of an existing telephone plug block 12a for connection to a second block 12b for accommodating a second telephone 11b; and, FIG. 1(c) illustrates the removal of a first telephone plug block 12a for replacement with a second dual plug block 15 to connect two telephones 11a and 11b to the LEC demarc. Another alternative is to change out the existing telephone 11a with a dual line telephone 11c, as shown in FIG. 1(d). However, phone replacement costs are high and in the case of portables, very expensive.

Another adverse condition of rewiring or changing wall telephones is the potential for damages. Inevitably, wallpaper is torn, painted areas are chipped, and, the replacement phone in all likelihood will not be in the old area. In the case of wall phones, access to concealed wiring is necessary, which ultimately requires removing the phone to access the wiring in the wall and exposing the provider to potential damage claims. The aforementioned solutions are not favorable to the customer.

Furthermore, it is more often the case that premises having multiple telephones that are presently provided with secondary telephone provider service (second line) will have that line terminated on only one phone that is connected with the new telephone service provider's line given the substantial costs necessary to terminate the secondary provider's line at EACH phone location. Customer usage of the new telephone service provider's network is not assured in a situation such as this.

To circumvent all of aforementioned pitfalls, it would be highly desirable to install in a premises having the need for multiple telephone line services provided by primary and secondary telephone service providers, a multifunctional interface box that will provide significant physical advantages to the customer while assuring the secondary service provider traffic on his network.

SUMMARY OF THE INVENTION

It is an object of the present invention to provide a multi-line interface device for providing multiple telephone line services to a home/office that is easy to install at a minimum cost.

Another object of the present invention is to provide a multi-line interface device that is optionally in series between each individual telephone station and the available central office dial tone lines of the primary and secondary provider.

A further object of the invention is to provide a multi-line interface device that is provided with an intelligent microcontroller and switching matrix for routing calls made from any connected telephone station to any central office line, or, routing of calls received from any central office (C.O.) line to any telephone station.

Still a further object of the invention is to provide a multi-line interface device that is provided with a novel call-waiting function for incoming calls, the function generating a call waiting indication tone for receipt by a telephone station having a call in progress, while simultaneously enabling ringing on other common bridged telephones connected to the device that are not in use (on-hook).

Yet a further object of the invention is to provide a multi-line interface device that performs call waiting features across multiple service lines.

Still another object of the present invention is to provide a multi-line interface device that makes cost savings decisions available to the consumer by allowing them to choose between service providers automatically to obtain the least cost routing of their calling needs.

Furthermore, an object of the invention is to provide a multi-line interface device that is configured for interfacing various equipment, e.g., telephones and PC or FAX modems, etc. with various service providers, e.g., telephone companies, cable television companies, etc.

Yet even further, an object of the invention is to provide a multi-line interface device that is for use with the evolving Hybrid Fiber Coax (HFC) networks being deployed by Multiple System Operators (MSOs) or Cable TV companies today. The integral use of fiber optic technology in the loop enables the network to be more reliable and secure vs. the traditional copper based telephone plant.

These and other objects of the present invention are attained with a multi-line interface device that routes incoming and outgoing communication signals between one or more service providers and one or more customer stations. The device comprises one or more line access modules each for establishing communication between an interface device and one or more service providers, a first of the one or more line access modules in communication with a first service provider and a second line access module in communication with a second service provider. Additionally, one or more station access modules is provided for establishing communication between the interface device and the one or more customer stations, each of the one or more station access modules connected with a dedicated customer station. A switching matrix device is provided for connecting signals between any of the line access modules and station access modules under the control of a control device.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENT

Figure 2:
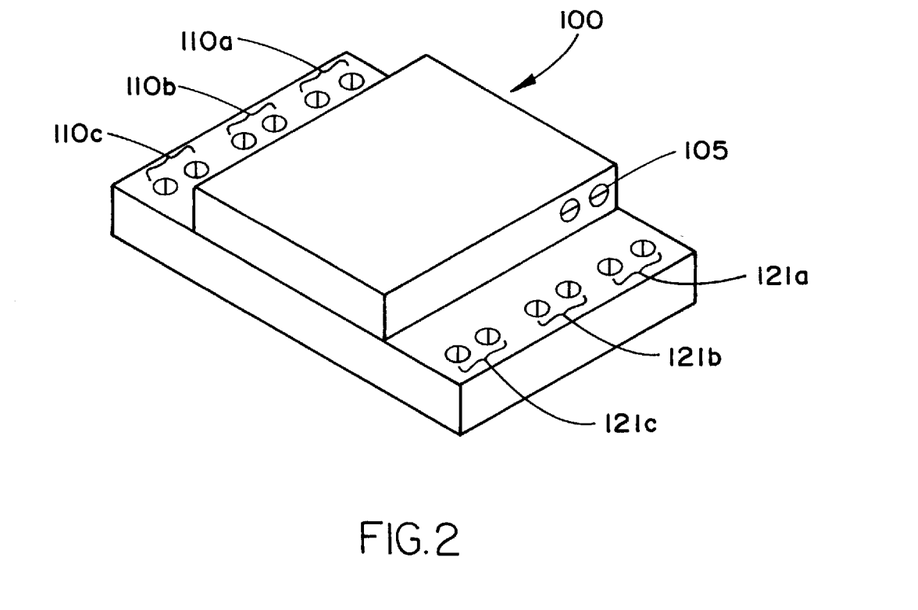
FIG. 2 illustrates a perspective plan view of the interface device enclosed within housing

FIG. 2 illustrates a physical view of the multi-line and station interface device 100 of the present invention. As explained above, the multi-line and station interface device 100 ("interface device") includes circuitry (explained in detail below) that is enclosed in high impact housing and that is easily installable in any accessible area adjacent to the present LEC (local exchange company) demarc block that is provided by an existing primary service provider. As shown in FIG. 2 and the functional diagram of FIG. 3, the circuitry for the interface device is powered by an interchangeable power converter module 130 on the circuit board. The selected module 130 is dependent upon two optional power sources. The first option is power available from the service terminating interface (DEMARC) at the service location. The line can be powered from a protected source and can provide 35–60 volt quasi square wave AC to the interface device on terminals 105. The second option is to power module 130 in the interface device with 24 volt DC from a low voltage transformer (not shown) connected to any available 110 volt AC source. The interface device may be deployed coincident with cable television and telephony services provided over a HFC cable network.

Figure 3:
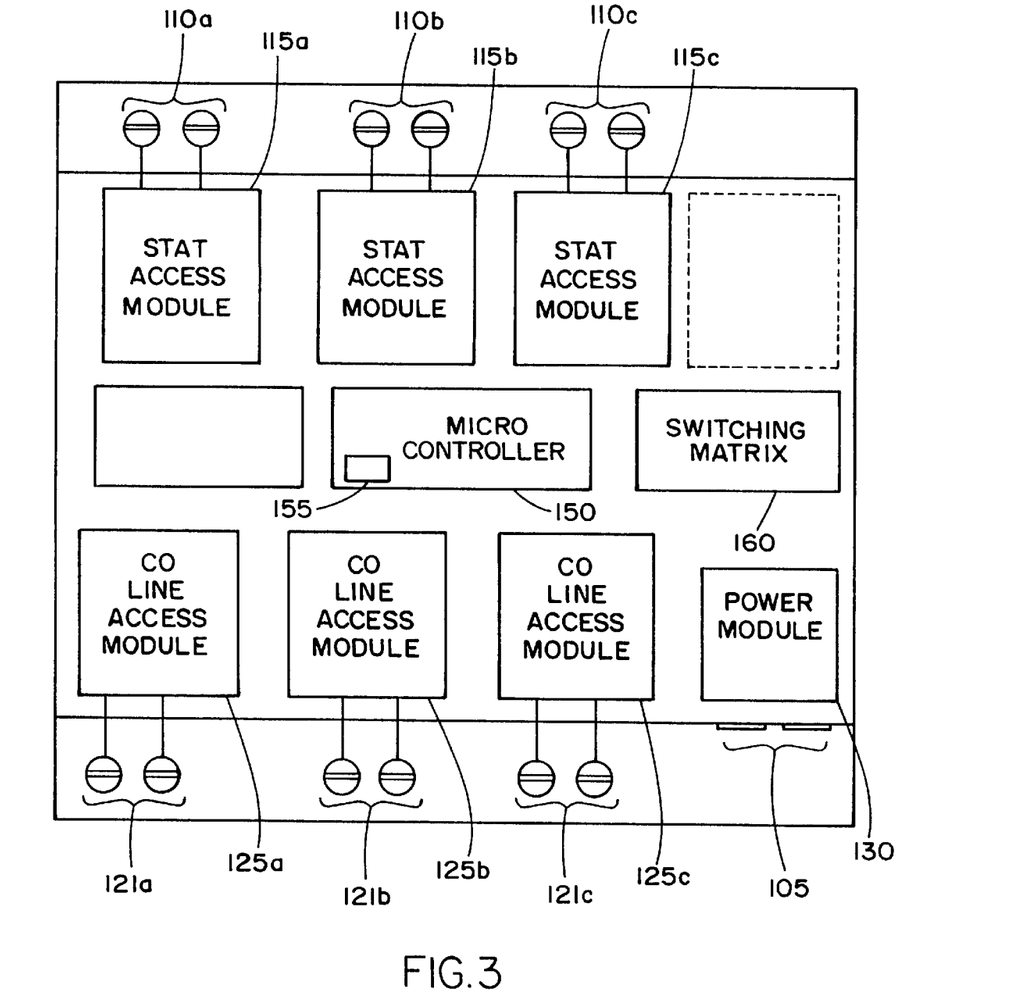
FIG. 3 illustrates a block diagram of the layout of the preferred embodiment of the interface device of the present invention.
Figure 4:
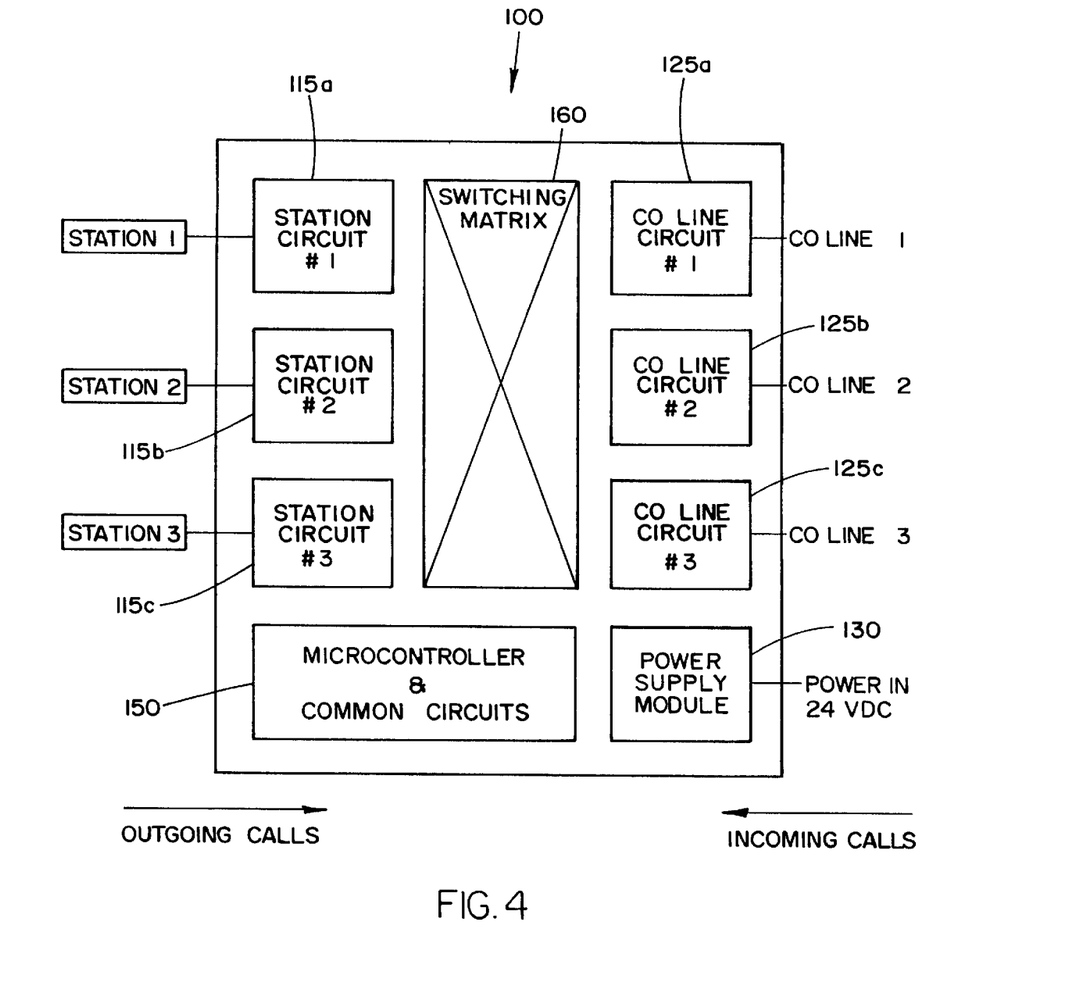
FIG. 4 illustrates a functional block diagram of the preferred embodiment of the interface device of the present invention.

To provide the functionality afforded by the multi-line interface device, the existing wiring that serves each telephone station is disconnected from a present demarc (not shown) for individual connection to respective phone station ports, three of which 110a, 110b, and 110c are indicated at one end of the interface device 100 as shown in FIGS. 2 and 3. Each of the telephone stations connections 110a, 110b, and 110c are connected to corresponding station access modules 115a, 115b, and 115c which are commercially available devices for processing signals emanating from and input to respective telephone stations 1, 2, and 3 as shown in FIG. 4. Particularly, each station access module 115a–115c consists of circuitry that is connected with a local battery feed source for providing proper termination to each respective on-hook station (e.g. telephone). It also provides the means of sending call status signals (for e.g., reorder tone and call waiting tone) when a telephone station is off-hook (i.e., in use).

In the preferred embodiment, the local exchange company ("LEC") demarc (not shown) may be connected to the interface device 100 at the designated LEC input terminals 121c as shown in FIG. 2, however any service provider central office line may suffice. The one or two central office lines of a secondary service provider are connected to corresponding line input terminals 121a, 121b as indicated in FIG. 2. Each of the line input terminals 121a–121c are connected with corresponding telephone service provider line access modules 125a, 125b, and 125c which are commercially available devices for communicating signals to/from central offices of telephone or alternate service providers. Particularly, each line access module 125a–125c consists of balanced loop current detector, and, active and resistive loop hold circuitry to present proper termination towards the CO Line when the line is put on hold or during a remote programming operation As can be seen in FIGS. 2 and 3, all telephone station connections are on one end of the interface device 100 and the incoming lines are on the opposite end, the interface device providing series connections between an individual telephone station and the available central office dial tone lines via switch connection matrix and bus 160. The telephone stations are no longer bridged together having access to only one C.O. line, but rather each station connection 110a–110c functions as an individual unbridged communications access facility as will be explained in further detail below.

Outgoing calls

The interface device 100 serves as a buffer to each telephone station waiting for a request by a telephone station to make an outside call. As shown in FIGS. 4, when a request to make a call is made, for e.g., by a telephone, PC or FAX modem labelled station 1, the telephone goes "off-hook" and a circuit is completed from the station 1 to its corresponding station access module 115a. Circuitry in the station access module 115a senses the closed circuit established by the telephone being off-hook and consequently sends a command signal to a microcontroller 150 and related circuitry 155. The microcontroller 150 polls each line line access module 125a–125c to determine which central office line is available and commands the switching matrix 160 to open up the station module connection with the common bus on the circuit board (not shown) for connection to the first available line access module. Additional line choices are made from a preprogrammed sequence. This results in the station receiving a dial tone from the central office of the service provider. A customer using the telephone may then proceed to dial the requested number with all line connections remaining in this state until the call is terminated. Upon hang-up, the telephone receiver is "on-hook" and the microcontroller commands the connection switching matrix 160 to open up the bridge between station access module 115a and the line access module. The station access module is restored across the common station bus and the line access module is restored to an idle status open to receive new status commands.

Incoming calls

An incoming phone call from a service provider's central office switch will provide ringing current across respective terminals 121a, 121b, and, 121c of the corresponding C.O. line access module 125a, 125b, and 125c. The ringing voltage is detected by the receiving line access module which then sends a signal to the microcontroller 150 which polls each station access module 121a–121c to determine the status of each. A station that is off-hook with a call in progress through another line module will respond its condition. The microcontroller then proceeds to send a command to the switching matrix 160 to connect the ringing line access module to the common bus and the stations (station access modules) that are in an on-hook idle status are bridged to the common bus. Thus, all on-hook stations receive the ringing current and associated ringing current circuitry for the particular station will present a functional signal. Under command from the microcontroller, suitable tone generator circuitry (not shown) will simultaneously generate an audible "beep" that is delivered to any off-hook stations having a call in progress. This audible beep tone is equivalent to the conventional call waiting beep tone that is presented to a station when call waiting service is available, however, the tone generated from the interface device may vary in duration or frequency from the tone provided by the service company provider. To distinguish the source of the incoming call, the interface device generated call waiting beep tone may consist of dual beeps for calls incoming on central office lines 1 and 2, and, a single beep for calls incoming on central office line 3.

Call waiting

It is understood that the interface device 100 establishes the connection of the incoming call to first station to pick up, and all other stations are clear to either make or receive calls. A station having a call in progress may flash the switch hook to signal its respective station access module that it desires to answer the incoming call. A signal is thus delivered to the microcontroller 150 to identify which line has the call waiting and the correct bus bridging is initiated to that station module. Concurrently, the original call is shunted by the line access module circuitry. Subsequent flash hook signals at the station having a call in progress will alternate station connection to either call, the interface device thus performing the call waiting feature across multiple service lines.

In the preferred embodiment, the first phone of the premises to request a call completion will control the microcontroller chip 150. Additionally, the microcontroller 150 may be programmed so that any station going off-hook can access any connected central office line in a priority based sequence, for e.g., sequential order. Once the call is routed and connected to the selected dial tone line via the switching matrix bus, the functions of the interface device are available to any other telephone station requesting completion of an out bound call. The same functions may be performed for that call, and the call is routed to the appropriate selection choice.

For example, as shown in FIG. 4, a call may be established between telephone station 1 (station access module 115a) that is switch connected to line access module 125a and finally to the service provider's C.O. switch. A second telephone station 2 or 3 may bridge, onto that call. In the manner described above, a station, for e.g., station 3, that goes off-hook will signal the microcontroller to select an idle line to effect a call. The microcontroller receives the request and verifies the next sequential idle line access module, e.g., 125b, for connection thereto. Thus, a dial tone will be received by telephone station 3.

If the customer at staion 3 does not wish to establish a new phone call, the switch hook contacts may be flashed and the station access module will recognize the interuption and send a signal to the microcontroller to command the switching matrix to remove the established line connection (bridge) between the station 3 and line access module 125b. The microcontroller then determines which line modules have a call in progress and proceeds to command the switching matrix to bridge station access module 115c for station 3 to the line access module 125a. If it is the case that the next sequential call module in effect is not the desired bridge, the customer may execute a second switch hook flash commanding the microcontroller to execute a rollover to the third line connection.

If a customer is using a PC or FAX modem that is connected to a telephone station, the call waiting feature may be disabled for all calls, or, for selected phone stations. Thus, the microcontroller 150 has the optional programmable feature of passing or blocking any beep tone signals to any station access module 115a–115c. Alternately, the call waiting feature may be disabled on a per call basis. To activate this feature, preset digits may be dialed before the actual number being called, and this input to the interface device will disable the call waiting tones.

Power failure

In the event of a power failure in the home resulting in a loss of power to the interface device, all telephone stations will be connected directly to line 2 for both incoming or outgoing calls. If an intermittent power loss at the power module terminals 105 of less than one second are detected, no calls in progress will be affected as special capacitive/inductive circuitry (not shown) provided to the microcontroller circuitry will sustain power. A power loss at the power module terminals 105 of durations greater than one second will draw power from the established line connection to maintain continuity between any station and any line connection. The bus bridging points in the station modules and the line modules will receive their power from the station line source as long as the circuit remains established. Upon disconnect, the specific line bridging assembly in each line or station module returns to its idle state.

If power is not stored at power terminals 105 after a loss of power at the power module, the interface device switches to a default condition wherein common bus bridging points in the station access modules return to their idle state. In the preferred embodiment, the microcontroller in the idle state establishes a bridge between all of the station access modules for direct connection to station access module 125a enabling both outgoing and incoming calls to/from the central office of service provider 1. The interface device will remain in this state until power is restored and detected by the microcontroller 150.

As mentioned above, when a station is going off-hook to initiate an outgoing call, the microcontroller selects the line connection in sequential order, e.g., line access module 125a, first; line module 125b, second; and line access module 125c, third. In the event battery is not detected in the line module it will deliver a failure state signal to the microcontroller. The microcontroller will select the next idle module and establish the call through it. Failure of the second selection will default to the third sequential choice line module.

If no service provider is connected to a line access module, the line access module can be locally or remotely programmed as inactive. Specifically, a command may be generated that blocks the particular line access module from all logic decisions for that unit in the microprocessor. Programming of the microcontroller of this feature is accomplished locally by connecting any standard dial tone multi-frequency (DTMF) to the particular station terminal and keying in the programming code, or, is accomplished remotely by dialing into the interface device and executing the proper code sequence.

Other customer local area signalling services (CLASS) functions (e.g., caller I.D., call forwarding, call message waiting, etc.) that the customer subscribes to will be available to any telephone station answering the incoming call. For example, the interface device will support call message waiting service that is currently available to a customer by either service provider, and will detect the "stuttered" dial tone indication that a message has been received by the service provider. When the interface device detects a stuttered tone, it will, in turn, provide a stuttered dial tone to any station going off hook.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed:

1. A multi-line and station interface device for providing multi-line access to single-line and multi-line customer stations without requiring additional wiring or line access selection buttons, said interface device comprising:
   (a) a plurality of line access modules each one of the plurality of line access modules for connecting to a different communication line;
   (b) a plurality of station access modules, for connecting to said customer stations;
   (c) a configurable bus switching device for enabling a direct line connection between any one of said plurality of line access modules and any one of said plurality of station access modules; and
   (d) a control device for controlling said bus switching device to enable automatic and selective access between the different communication lines provided by one or more service providers and any one of said customer stations, the control device further enabling simultaneous conversations to be carried on the different communication lines by allowing a connection between one of said plurality of station access modules and one of said plurality of line access modules, while at the same time also allowing a second connection between another one of said plurality of station access modules and another one of said plurality of line access modules.

2. The multi-line and station interface device as claimed in claim 1, wherein said switching device is configurable to route communication signals in a predetermined order.

3. The multi-line and station interface device as claimed in claim 1, whereupon a request from any of said customer stations to place a station call, said control device establishes a connection with a dial tone provided by any one of said one or more service providers.

4. The multi-line and station interface device as claimed in claim 3, wherein said control device establishes connection with the dial tone provided by a user-selected service provider.

5. The multi-line and station interface device as claimed in claim 3, wherein there are at least two of said service providers, and whereupon a request from any of said customer stations to place a predetermined station call, said control device establishes the connection with the dial tone provided by a first one of said one or more service providers.

6. The multi-line and station interface device as claimed in claim 5, wherein a second one of said one or more service providers is a local exchange company.

7. The multi-line and station interface device as claimed in claim 5, wherein said predetermined station call is one of an operator service, information service, emergency service, and long distance call.

8. The multi-line and station interface device as claimed in claim 5, wherein said first service provider is a long distance service provider.

9. The multi-line and station interface device as claimed in claim 1, wherein an incoming call from any one of said one or more service providers is routed through said bus switching device to every one of said customer stations that are available for use.

10. The multi-line and station interface device as claimed in claim 1, wherein there are at least two of said service providers, and wherein a first one and a second one of said service providers generates respective first and second audible tones for communication to a customer station that is in use, said first service provider generating said first audible tone for receipt by said customer station when an incoming call is provided by said first service provider, and, said second service provider generating said second audible tone for receipt by said customer station when an incoming call is provided by said second service provider.

11. The multi-line and station interface device as claimed in claim 1, wherein at least one of said plurality of line access modules is adapted to accommodate a Multiple System Operators.

12. The multi-line and station interface device as claimed in claim 1, wherein at least one of said plurality of line access modules is adapted to accommodate a Hybrid Fiber Coax connections.

13. A multi-line and station interface device for providing multi-line access to a plurality of single-line telephone sets in a home from one or more telephone lines provided by a local exchange company (LEC) and one or more communication lines provided by a multiple service operator (MSO), said multi-line and station interface device adopted to be mounted on said home at a point of entry for said local exchange company without requiring additional wiring or line selection buttons for said telephone sets, said multi-line and station interface device comprising:
   (a) a plurality of line access modules, one of said plurality of line access modules connected to a telephone line provided by said local exchange company, and another of said plurality of line access modules connected to a communication line provided by said multiple service operator;
   (b) a plurality of station access modules for connecting to the plurality of single-line telephone sets;
   (c) a configurable switching device for enabling direct line connections between said line access modules and said station access modules; and
   (d) a control device for controlling said bus switching device to enable access between any one of said telephone line provided by said local exchange company and said communication line provided by said multiple service operator and any one of said telephone sets, the control device further having a capability to enable simultaneous conversations to be carried on different lines by allowing a connection between said telephone line and one of said telephone sets, while at the same time allowing a second connection between said communication line and another one of said telephone sets.

14. The multi-line and station interface device as claimed in claim 13 wherein said switching device is configurable to route communication signals in a predetermined order.

15. The multi-line and station interface device as claimed in claim 13 whereupon a request from any of said plurality of single-line telephone sets to place a station call is responded to by said control device to establish a direct line connection with a dial tone provided by either said local exchange company or said multiple service operator.

16. The multi-line and station interface device as claimed in claim 15 wherein said control device establishes connection with a user-selected telephone or communication line.

17. The multi-line and station interface device as claimed in claim 15 whereupon a request from any of said plurality of single-line telephone sets to place a predetermined station call, said control device establishes connection with a dial tone provided on a telephone line provided by said local exchange company.

18. The multi-line and station interface device as claimed in claim 16 wherein said switching device routes a local station call for a long distance service to a communication line provided by said multiple service operator.

19. The multi-line and station interface device as claimed in claim 13 wherein additional line access modules are provided for a multi-line telephone set.

20. The multi-line and station interface device as claimed in claim 13 wherein an incoming call is routed from either said telephone line or said communication line through said bus switching device to every telephone that is available for use.

* * * * *